Jan. 17, 1950 G. A. TINNERMAN 2,495,037
FASTENING DEVICE
Filed March 7, 1949 2 Sheets-Sheet 1
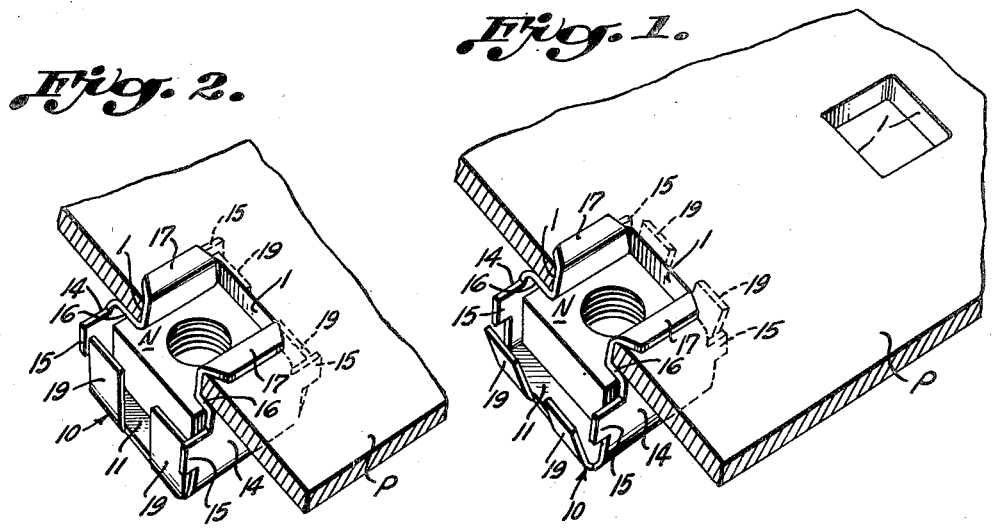
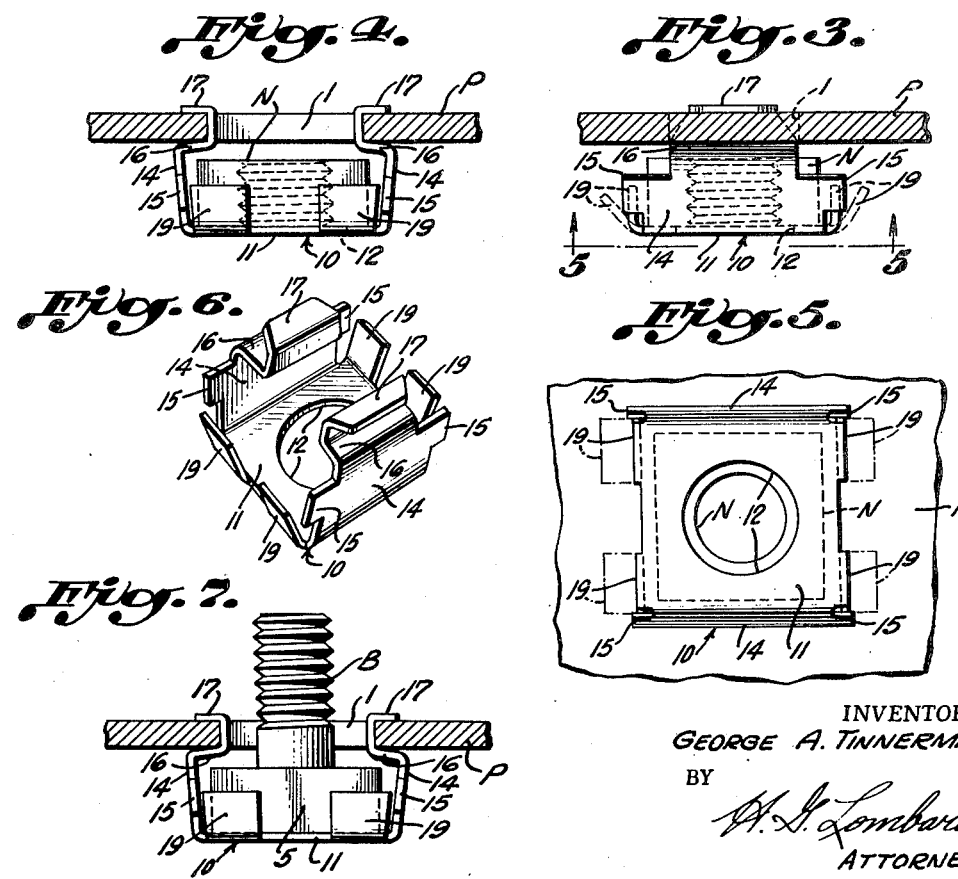
INVENTOR.
GEORGE A. TINNERMAN
BY
H. G. Lombard
ATTORNEY Jan. 17, 1950 G. A. TINNERMAN 2,495,037
FASTENING DEVICE
Filed March 7, 1949 2 Sheets-Sheet 2
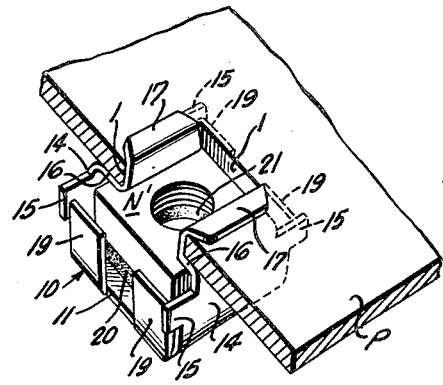
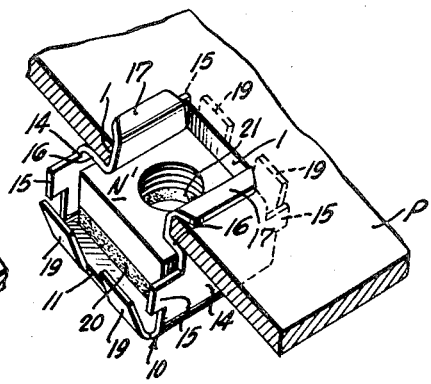
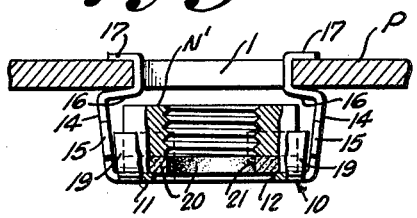
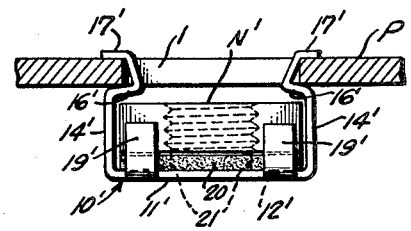
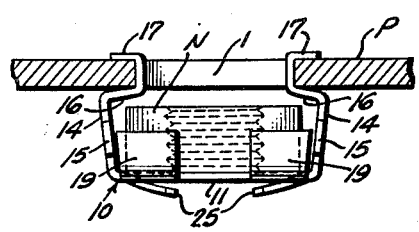
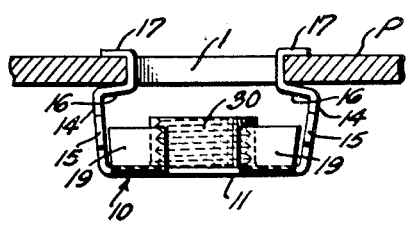
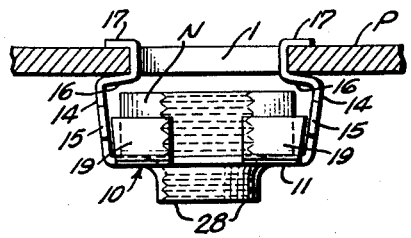
INVENTOR.
GEORGE A. TINNERMAN
BY
H. G. Lombard
ATTORNEY Patented Jan. 17, 1950

2,495,037

UNITED STATES PATENT OFFICE 2,495,037

FASTENING DEVICE

George A. Tinnerman, Cleveland, Ohio, assignor to Tinnerman Products, Inc., Cleveland, Ohio, a corporation of Ohio Application March 7, 1949, Serial No. 79,990

19 Claims. (Cl. 85—32)

This invention relates in general to bolt and nut fastened installations and deals, more particularly, with improvements in fastening devices for attaching nuts, bolts, screws, rivets, and similar studs in fastening position in an assembly prior to the application of a cooperating fastening device thereto for securing the parts of the assembly.

In many assemblies, it is necessary or desirable to use a standard nut and bolt fastening means but it is usually a difficult problem, especially in blind locations, for the operator to hold the bolt or nut in place as the cooperating fastener is applied, or otherwise, to maintain the same against relative rotation during the final tightening of the fasteners. In such an assembly in which the rearward side of a part is not conveniently or readily accessible for holding a bolt or nut in fastening position prior to the application of the cooperating fastener, it has been the practice to resort to various forms of cage devices requiring a welding or riveting operation for attaching the same in providing means for holding the nut or bolt in fastening position. A welding or riveting operation involves considerably increased costs in manufacture which often make the use of this type of holder prohibitive in many installations requiring a cheap and inexpensive fastening means. Welded or riveted holders otherwise are objectionable by reason of the inordinate amount of time required in the installation thereof and the lack of any provision for shifting of the bolt or nut in attached position to compensate for misalignment of the openings in the parts secured.

In United States Patent Number 2,391,046 issued December 18, 1945, there is disclosed a general form of nut holder by the present inventor which is installed in attached position on a support by an easy clip or snap fastening procedure that is much quicker and considerably cheaper than that involved in the use of the aforementioned cage devices requiring a costly and time consuming riveting or welding operation.

In the use of nut holders constructed in accordance with this patent, it has been found in applications wherein a power driver is employed to apply a bolt into a previously attached nut, that the impact of the power driver in the initial application of the bolt to the nut occasionally causes a displacement of the nut and nut holder from proper attached position. In accordance with the present invention, such nut holders and the like are so constructed as to be positively locked and anchored in attached position and thereby adapted to withstand such impact of a power driver or other force which might have a tendency to displace the nut and nut holder from proper and effective attached position.

A primary object of the invention, therefore, is to provide a holder or retainer for a nut, bolt or other clamping member which comprises clip or snap fastened attaching means in the form of spring arms or fingers which are received in a work opening in the attached position of the holder, and also separate tabs or lugs which are adapted to be bent into abutting engagement with said spring arms to lock the same against movement in the direction for removal from attached position in the work opening.

A further object of the invention is to provide such a nut or bolt holder in which the attaching arms or fingers extend completely free and independent of the locking tabs for easy and quick application to attached position by a simple clip or snap fastening action.

Another object of the invention is to provide various forms of nut and bolt holders of this character which provide for shifting or adjustment of the attached fastener as necessary to compensate for misalignment of the bolt openings in the parts secured.

A further object of the invention is to provide various constructions of an improved combined nut and nut holder together with means for effecting an automatic thread locking action on the associated bolt in final position.

An additional object of the invention is to provide various improved forms of fasteners of the kind described for retaining an ordinary threaded nut member in attached fastening position on a support and which are provided with an integral thread portion for threadedly engaging the associated bolt in effecting an automatic thread locking action thereon, and further, with such a fastener provided with an integral thread portion being otherwise usable without a threaded nut member as a self-attached, one-piece sheet metal spring nut for securing assemblies of lightweight parts, and the like.

Further objects and advantages, and other new and useful features in the construction, arrangement and general combination of parts of the invention will be readily apparent as the following description proceeds with reference to the accompanying drawings, for purposes of illustration but not of limitation, in which like reference characters designate like parts throughout, and in which:

Fig. 1 is a perspective view showing an assembled nut and nut holder in accordance with the invention as initially attached in an opening in a panel or the like, represented in section;

Fig. 2 is a similar view showing the nut and nut holder in final attached position in which the locking tabs or lugs on the nut holder are bent into position for locking the holder against loosening or displacement from attached position;

Fig. 3 is a sectional view showing the attached nut and nut holder in elevation as seen from an end of the nut holder;

Fig. 4 is a sectional view showing the attached nut and nut holder in elevation as seen from a side of the nut holder;

Fig. 5 is a bottom plan view of the nut and nut holder shown in Fig. 3 as seen along line 5—5, looking in the direction of the arrows; and, Fig. 6 is a perspective view of the nut holder per se shown employed in Figs. 1–5 inclusive.

Fig. 7 is an end view similar to Fig. 4 showing the improved holder as employed to retain a bolt in attached fastening position;

Fig. 8 is a perspective view similar to Fig. 1 showing the nut holder in initially attached position for retaining a nut provided with a fibre or plastic locking element for effecting a thread locking action on the associated bolt in final position;

Fig. 9 is a view similar to Fig. 8 showing the nut holder in fully attached position with the locking tabs bent into position for locking the nut holder against loosening or displacement; and, Fig. 10 is a side view of the fastener shown in Fig. 9 with portions broken away to show the nut, nut holder and thread locking element partly in section;

Fig. 11 is a sectional view showing in side elevation a modification in which the nut is provided with a fibre or plastic locking element for effecting a thread locking action on the associated bolt;

Fig. 12 is a similar view of a further form of combined nut and nut holder provided with an integral thread portion in the form of cooperating spring tongue elements for effecting an automatic thread locking action on the associated bolt;

Fig. 13 is a similar view of another form of combined nut and nut holder provided with an integral thread portion in the form of an outward threaded hub for effecting a thread locking action on the associated bolt; and, Fig. 14 is a side elevational view of another embodiment of the invention comprising a nut member provided by an inward integral tubular thread portion on the body of the fastener.

Referring now, more particularly, to the drawings, Figs. 1–6 inclusive show a form of fastener 10 in accordance with the invention as provided for use as a holder or retainer for a nut. The fastener is constructed from a sheet metal section of a size and configuration determined by the shape and size of the nut with which it is to be used and may be readily provided for use with any other kind of nut or equivalent work clamping member such as the head of a bolt.

In the present example, the holder is shown as constructed for use with a standard square threaded nut to be attached in fastening position over a generally rectangular opening 1 in a supporting part such as a panel or plate P. The nut holder may be readily constructed for attachment in a circular hole or other opening of any selected design but the use, generally, of a rectangular opening, as shown, is advantageous in that it is relatively simple to form and otherwise provides for a fixed nonrotative attachment of the nut holder in applied position. Any suitable sheet metal may be employed for making the nut holder 10 but preferably that of a spring metal nature such as spring steel or cold rolled steel having spring-like characteristics.

The sheet metal blank forming the nut holder 10 is bent to define a base or central body portion 11 having an enlarged bolt passage 12 and end portions extending in the same general direction to form a pair of spring fingers or spring arms 14 having opposing wall portions disposed in slightly outwardly inclined relation. The side edges of said spring arms 14 are suitably undercut to provide lateral projections 15 while the free end portions thereof are provided in a reduced width slightly less than the width of the panel opening 1. Such free end portions of reduced width are bent to form inward flanges 16 together with return bent outwardly extending tongues or hook elements 17, or the like, which in untensioned relation, are spaced apart a distance greater than the width of the panel opening 1. The said hook elements 17 otherwise are preferably provided in a predetermined spacing from the inward flanges 16 corresponding substantially to the thickness of the panel adjacent the panel opening so as to clasp opposing marginal portions of the panel opening in snug frictional engagement therewith. In any case, the spring fingers or spring arms 14 extend from the central body portion 11 in entirely free and independent relation so that they are highly yieldable and may be readily flexed as necessary for an easy and quick attachment of the hooks 17 with the edges of the panel opening.

At the sides of the nut holder 10, separate and independent locking tabs or lugs 19 are bent to extend downwardly from the side edges of the central body portion 11. As shown in Figs. 1, 3 and 6, the locking tabs 19 are disposed in outwardly inclined relation in their initial position as illustrated by the broken lines in Fig. 3 and in full lines in Figs. 1 and 6. The locking tabs 19 in such initial outwardly inclined relation are disposed in proximity to the lateral projections 15 on the spring arms but are entirely clear of the same so as not to interfere with or in any way resist or impede the flexing of said spring arms 14 as necessary for an easy and quick application of the nut holder to its initially attached position as illustrated in Fig. 1. After the nut holder has been thus initially attached, the locking tabs 19 are adapted to be bent inwardly as necessary to define abutments or stops at the rear of the lateral projections on said spring arm 14, as illustrated in Figs. 2 and 4 and in full and dotted lines in Fig. 3.

The general form of nut holder, accordingly, comprises a cage-like structure in which the nut N is retained by the opposing walls of the spring arms 14 at the ends of the nut holder and the outwardly inclined locking tabs 19 along the sides of the nut holder. The nut holder is constructed to conform generally to the shape of the nut in a somewhat larger size to provide for a floating mounting of the nut within the nut holder. The arrangement otherwise is such that the spring arms 14 may be spread apart as necessary to slip the nut N through the space between the hooks 17 on the ends thereof to a position in which the holder retains the nut in the manner of a cage device defined by said spring arms and locking lugs in their initial outwardly inclined relation, as aforesaid. The nut N as thus retained by the nut holder of relatively larger size has its threaded opening in line with the enlarged bolt passage 12 in the central body of the holder and is capable of considerable shifting or adjustment within the nut holder as necessary to compensate for misalignment or other irregularities in the bolt holes in the parts to be secured.

The assembled nut and nut holder thus provided is easily and quickly attached in the panel opening 1 simply by compressing the outwardly inclined opposing wall portions of the spring arms 14 to move the hooks 17 on the ends thereof inwardly toward each other. In this relation, the hooks 17 still have their extremities farther apart than the width of the panel opening 1. Accordingly, in attaching the nut holder, one hook is passed through the opening with the other hook resting on the face of the panel adjacent the opening. The clearance between the nut and the spring arms 14 enables the latter hook to be pressed inwardly and sprung sufficiently so that it may also pass through the opening and thus be received in said opening. The spring arms are then released from their compressed condition and in attempting to assume their normal outwardly inclined relation, both hooks 17 are forced to spread apart and thereby frictionally and grippingly engage the adjacent marginal edges of the panel opening, as shown in Fig. 5, to retain the nut holder in initially attached position. The spring arms 14, as thus attached, do not assume their normal untensioned relation but rather, remain biased slightly inwardly in the engaged position of the hooks as illustrated in Fig. 4. Accordingly, the attachment of the hooks 17 on the spring arms is effected entirely by spring action and without need for mechanical bending of said hooks.

It will be appreciated that the described initial step in the attachment of the nut holder, as shown in Figs. 1 and 4, is effected entirely by the spring arms 14 which are completely free and independent of the locking tabs 19; consequently, said spring arms 14 are so flexible and pliable that they may be readily manipulated by the fingers of a worker as necessary to attach the nut holder easily and quickly and in a minimum of time and effort which, of course, is highly important in assembly line mass production methods of manufacture.

With the hooks 17 engaged in the panel opening in the initially attached position of the nut holder, the outwardly inclined locking tabs 19 are bent inwardly by any suitable tool to a position in which the edges of said tabs are in the path of the lateral projections 15 on the spring arms as shown in Fig. 2 and in full and dotted lines in Fig. 3. In this relation, the locking tabs 19 serve as abutments or stops adapted to bear against the lateral projections 15 on the spring arms 14 to prevent inward movement of said spring arms in the direction for disengaging the hooks 17 from attached position in the panel opening. The hooks 17 accordingly, are locked in attached position by the locking tabs 19 and are restrained against displacement by any likely force which might otherwise cause dislocation or removal of the nut holder from attached position, as, for example, when subjected to a severe impact taking place in the use of a power driver for applying the associated bolt to the nut within the nut holder.

In the fully attached position of the nut holder, the inwardly bent flanges 16 hold the nut slightly out of contact with the panel and accordingly, when the associated bolt is applied and tightened, the nut is drawn against said inward flanges 16 to flatten and tension the same. The spring force thus set up in said inward flanges 16 tends to urge the nut outwardly from the panel in a manner which causes a frictional binding between the nut threads and the threads on the bolt to produce an effective thread locking action on the bolt that prevents loosening thereof from tightened fastening position.

As illustrated in Fig. 7, the improved holder 10 is equally adaptable to use as a retainer for a bolt B or other work clamping fastener having a head 5 approximating the size and proportions of the nut with which the holder is used as disclosed with reference to Figs. 1–6 inclusive. The head 5 of the bolt is readily assembled in the holder 10 and this assembly easily and quickly attached in the panel opening 1, as shown in Fig. 7, in the same general procedure described in which the spring arms 14 are manipulated to engage the hooks 17 with marginal portions of the panel opening 1. The locking tabs 19 are then bent inwardly into abutting relation with the lateral projections 15 on the spring arms to lock said hooks in the final attached position of the holder with the bolt retained thereby in operative fastening position for the application of an associated nut thereto.

In some installations, it is necessary or desirable to provide for an increased, more pronounced locking action on the bolt. As shown in Figs. 8, 9, and 10, in such instances, the nut holder 10 similar to that shown and described with reference to Figs. 1–6 inclusive, is so constructed as to retain both a nut N' and a cooperating locking element such as a fibre or plastic washer 20. In a preferred form, the fibre or plastic washer 20 is provided as a disc-like element which is securely united to the top of the nut by adhesive or other suitable means and is provided with a circular unthreaded opening 21 slightly smaller than the threaded opening in said nut N'. The arrangement is such that the bolt is applied to the nut N' in the usual manner and as it advances through the slightly smaller opening 21 in the fibre or plastic washer 20, the bolt thread cuts through said washer as necessary for the bolt to pass to tightened fastening position. In this relation, the fibre or plastic material of the washer surrounding the bolt exerts a pronounced binding and gripping action on one or two or more of the engaged thread convolutions of the bolt to provide an effective thread locking action thereon which prevents loosening of the bolt from tightened fastening position. In an alternate arrangement, as shown in Fig. 11, such a fibre or plastic lock washer 20 is provided separate from the nut N' and is retained in proper assembly therewith by a similar nut holder 10' having the same general type of spring arms 14' and inturned flanges 16' carrying outwardly extending hooks 17'. However, the spring arms 14' and side tabs 19' are arranged with a closer fit around both the nut and the washer as necessary to maintain the same in an aligned relation in which the opening 21 in the washer is in suitable registration with the threaded opening in the nut. Accordingly, when the associated bolt is applied and tightened, the plastic or fibre washer 20 serves to provide a pronounced binding and gripping thread locking action on the bolt in the same general manner described with reference to Figs. 8, 9, and 10.

Fig. 12 discloses another form of the invention in which the nut holder is provided with means for effecting an automatic thread locking action on the associated bolt. The nut holder is constructed and used in the same general manner as that described with reference to Figs. 1-6 inclusive but, in addition, the central body portion 11 thereof is provided with integral resilient bolt engaging means such as a pair of cooperating resilient tongues 25 which are struck and formed from said body portion 11 to project outwardly out of the plane thereof. Said tongues preferably are provided by a pair of spaced parallel slits on opposite sides of a central opening which forms the tongues with spaced extremities correponding to the root of the associated bolt and adapted for threadedly engaging the thread of said bolt under tension. The arrangement is such that the associated bolt is applied in the usual manner and as the bolt passes through the nut N to tightened position, said tongues 25 threadedly engage the bolt under tension and have a frictional and gripping binding engagement with the bolt thread to provide a pronounced locking action on the bolt in final tightened position.

Fig. 13 shows a further embodiment of the invention in which the nut holder 10, is provided with another form of integral bolt thread engaging means for effecting an automatic thread locking action on the bolt similarly to the embodiment of Fig. 12. The central body portion 11 of the nut holder is formed with an integral tubular hub 28 which is drawn therefrom to project outwardly out of the plane thereof. The tubular hub 28 is provided wtih an internal thread which is out of phase with or slightly smaller than the bolt thread or is slightly distorted so as to exert a binding thread locking action on the bolt in tightened position with the nut N.

Fig. 14 shows another embodiment of the invention wherein the general form of fastener 10 is provided as a one-piece nut member which is attached in the panel opening 1 and locked in such attached position in the same general manner as that described with reference to Figs. 1-6 inclusive. The central body portion 11 of the fastener is provided with an inwardly extending tubular hub 30 which is drawn therefrom and suitably threaded for threadedly engaging an associated bolt. The fastener thus provided actually is a self-attached, one-piece sheet metal spring nut of general utility which is complete in itself and relatively light in weight and thereby admirably suited for use in the fabrication of lightweight structures. Likewise, the sheet metal fasteners shown in Figs. 12 and 13 may be provided without the nut members N and used as self-attached one-piece sheet metal spring nuts of general utility in securing assemblies of lightweight parts and in a wide range and variety of nonstructural applications.

While the invention has been described in detail with specific examples, such examples are intended as illustrations only inasmuch as changes in the construction, arrangement and application of the fasteners within the broad scope of the instant disclosures are fully intended.

What is claimed is:

1. A fastener comprising a piece of sheet metal bent to provide a base and spring arms at the ends of said base extending in the same general direction, said spring arms being provided with means for securing the fastener in attached position in a work opening and extending free and separate from the remainder of the fastener so as to be readily manipulated in applying the fastener to attached position, and a tab extending from the side of said fastener base adapted to be bent into abutting relation with one of said spring arms to lock the same in the attached position of the fastener.

2. A fastener comprising a piece of sheet metal bent to provide a base and spring arms at the ends of said base extending in the same general direction, said spring arms being provided with means for securing the fastener in attached position in a work opening and extending free and separate from the remainder of the fastener so as to be readily manipulated in applying the fastener to attached position, and tabs extending from the sides of said fastener base adapted to be bent into abutting relation to said spring arms to lock said spring arms in the attached position of the fastener.

3. A fastener comprising a piece of sheet metal bent to provide a base and spring arms at the ends of said base extending in the same general direction, said spring arms being provided with means for securing the fastener in attached position in a work opening and extending free and separate from the remainder of the fastener so as to be readily manipulated in applying the fastener to attached position, and a pair of tabs extending from opposite sides of said fastener base adapted to be bent into abutting relation with the lateral edge portions of one of said spring arms to lock the same in the attached position of the fastener.

4. A fastener comprising a piece of sheet metal bent to provide a base and spring arms at the ends of said base extending in the same general direction, said spring arms being provided with means for securing the fastener in attached position in a work opening and extending free and separate from the remainder of the fastener so as to be readily manipulated in applying the fastener to attached position, and pairs of tabs extending from opposite sides of said fastener base adjacent each spring arm adapted to be bent into abutting relation to the lateral edge portions of said spring arms to lock said spring arms in the attached position of the fastener.

5. A fastener comprising a piece of sheet metal bent to provide a base and spring arms at the ends of said base extending in the same general direction and having a lateral projection, said spring arms being provided with means for securing the fastener in attached position in a work opening and extending free and separate from the remainder of the fastener so as to be readily manipulated in applying the fastener to attached position, and a tab extending from the side of said fastener base adjacent said lateral projection and adapted to be bent into abutting relation to said lateral projection.

6. A fastener comprising a piece of sheet metal bent to provide a base and spring arms at the ends of said base extending in the same general direction and having lateral projections, said spring arms being provided with means for securing the fastener in attached position in a work opening and extending free and separate from the remainder of the fastener so as to be readily manipulated in applying the fastener to attached position, and tabs extending from the sides of said fastener base adjacent said lateral projections and adapted to be bent into abutting relation to said lateral projections to lock said spring arms in the attached position of the fastener.

7. A fastener comprising a piece of sheet metal bent to provide a base and spring arms at the ends of said base extending in the same general direction, said spring arms being provided with means for securing the fastener in attached position in a work opening and extending free and separate from the remainder of the fastener so as to be readily manipulated in applying the fastener to attached position, at least one of said spring arms having a pair of lateral projections, and a pair of tabs extending from opposite sides of said fastener base adjacent said pair of lateral projections and adapted to be bent into abutting relation to said lateral projections to lock the associated spring arm in the attached position of the fastener.

8. A fastener comprising a piece of sheet metal bent to provide a base and spring arms at the ends of said base extending in the same general direction, said spring arms being provided with means for securing the fastener in attached position in a work opening and extending free and separate from the remainder of the fastener so as to be readily manipulated in applying the fastener to attached position, each of said spring arms having a pair of lateral projections, and a pair of tabs extending from opposite sides of said fastener base adjacent each pair of said lateral projections and adapted to be bent into abutting relation therewith to lock said spring arms in the attached position of the fastener.

9. A fastening device comprising a nut and cooperating locking element and a spring holder comprising a piece of sheet metal bent to provide a base and a pair of spring arms at the ends of said base extending in the same general direction and having inwardly bent flanges underlying the nut and outwardly extending hooks for attaching the fastening device in a work opening, and tabs extending from opposite sides of said base retaining the nut and locking element between said spring arms of the holder, said tabs being adapted to be bent into abutting relation to said spring arms to lock said spring arms in the attached position of the fastening device.

10. A fastening device comprising a nut and cooperating locking element and a spring holder comprising a piece of sheet metal bent to provide a base and a pair of spring arms at the ends of said base extending in the same general direction and provided with lateral projections, said spring arms having inwardly bent flanges underlying the nut and outwardly extending hooks for attaching the fastening device in a work opening, and tabs extending from opposite sides of said base retaining the nut and locking element between said spring arms of the holder, said tabs being adapted to be bent into abutting relation to said lateral projections to lock said spring arms in the attached position of the fastening device.

11. A fastening device comprising a nut and cooperating locking element and a spring holder comprising a piece of sheet metal bent to provide a base and a pair of spring arms at the ends of said base extending in the same general direction and provided with lateral projections, said spring arms having inwardly bent flanges underlying the nut and outwardly extending hooks for attaching the fastening device in a work opening, and tabs extending from opposite sides of said base adjacent said lateral projections on the spring arms and retaining the nut and locking element between said spring arms of the holder, said tabs being adapted to be bent into abutting relation to said lateral projections to lock said spring arms in the attached position of the fastening device.

12. A fastening device comprising a nut and cooperating locking element and a spring holder comprising a piece of sheet metal bent to provide a base and a pair of spring arms at the ends of said base extending in the same general direction and provided with lateral projections, said spring arms having inwardly bent flanges underlying the nut and outwardly extending hooks for attaching the fastening device in a work opening, and a pair of spaced tabs extending from each side of said base adjacent said lateral projections on the spring arms and retaining the nut and locking element between said spring arms of the holder, said tabs being adapted to be bent into abutting relation to said lateral projections to lock said spring arms in the attached position of the fastening device.

13. A fastening device comprising a nut and cooperating locking element and a spring holder comprising a piece of sheet metal bent to provide a base and a pair of spring arms at the ends of said base extending in the same general direction and having inwardly bent flanges underlying the nut and outwardly extending hooks for attaching the fastening device in a work opening, and a pair of spaced tabs extending from each side of said base retaining the nut and locking element between said spring arms of the holder.

14. A fastening device comprising a nut and a spring holder comprising a piece of sheet metal bent to provide a base and a pair of spring arms at the ends of said base extending in the same general direction and having inwardly bent flanges underlying the nut and outwardly extending hooks for attaching the fastening device in a work opening, tabs extending from opposite sides of said base retaining the nut between said spring arms of the holder and being adapted to be bent into abutting relation to said spring arms to lock said spring arms in the attached position of the fastener, and means on said base of the spring holder for engaging a bolt in conjunction with the nut.

15. A fastening device comprising a nut and a spring holder comprising a piece of sheet metal bent to provide a base and a pair of spring arms at the ends of said base extending in the same general direction and having inwardly bent flanges underlying the nut and outwardly extending hooks for attaching the fastening device in a work opening, tabs extending from opposite sides of said base retaining the nut between said spring arms of the holder and being adapted to be bent into abutting relation to said spring arms to lock said spring arms in the attached position of the fastener, and means on said base of the spring holder for engaging a bolt in conjunction with the nut comprising a pair of cooperating tongues provided from the material of said base.

16. A fastening device comprising a nut and a spring holder comprising a piece of sheet metal bent to provide a base and a pair of spring arms at the ends of said base extending in the same general direction and having inwardly bent flanges underlying the nut and outwardly extending hooks for attaching the fastening device in a work opening, tabs extending from opposite sides of said base retaining the nut between said spring arms of the holder and being adapted to be bent into abutting relation to said spring arms to lock said spring arms in the attached position of the fastener, and means on said base of the spring holder for engaging a bolt in conjunction with the nut comprising an integral tubular hub drawn from the material of said base.

17. A fastener comprising a piece of sheet metal bent to provide a base and spring arms at the ends of said base extending in the same general direction and having lateral projections, said spring arms being provided with means for securing the fastener in attached position in a work opening and extending free and separate from the remainder of the fastener so as to be readily manipulated in applying the fastener to attached position, tabs extending from the sides of said fastener base adjacent said lateral projections and adapted to be bent into abutting relation to said lateral projections to lock said spring arms in the attached position of the fastener, and means on said fastener base for engaging a bolt or screw.

18. A fastener comprising a piece of sheet metal bent to provide a base and spring arms at the ends of said base extending in the same general direction and having lateral projections, said spring arms being provided with means for securing the fastener in attached position in a work opening and extending free and separate from the remainder of the fastener so as to be readily manipulated in applying the fastener to attached position, tabs extending from the sides of said fastener base adjacent said lateral projections and adapted to be bent into abutting relation to said lateral projections to lock said spring arms in the attached position of the fastener, and means on said fastener base for engaging a bolt or screw comprising a pair of cooperating tongues provided from the material of said base.

19. A fastener comprising a piece of sheet metal bent to provide a base and spring arms at the ends of said base extending in the same general direction and having lateral projections, said spring arms being provided with means for securing the fastener in attached position in a work opening and extending free and separate from the remainder of the fastener so as to be readily manipulated in applying the fastener to attached position, tabs extending from the sides of said fastener base adjacent said lateral projections and adapted to be bent into abutting relation to said lateral projections to lock said spring arms in the attached position of the fastener, and means on said fastener base for engaging a bolt or screw comprising an integral tubular hub drawn from the material of said base.

GEORGE A. TINNERMAN.

No references cited.